(12) United States Patent
Park et al.

(10) Patent No.: US 7,752,528 B2
(45) Date of Patent: Jul. 6, 2010

(54) DIGITAL BROADCASTING TRANSMISSION CAPABLE OF IMPROVING RECEIVING AND EQUALIZING PERFORMANCE AND SIGNAL PROCESSING METHOD THEREOF

(75) Inventors: Eui-jun Park, Seoul (KR); Yong-deok Chang, Suwon-si (KR); Sung-soo Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1010 days.

(21) Appl. No.: 11/416,248

(22) Filed: May 3, 2006

(65) Prior Publication Data

US 2007/0033475 A1 Feb. 8, 2007

Related U.S. Application Data

(63) Continuation of application No. PCT/KR2005/001940, filed on Jun. 23, 2005.

(30) Foreign Application Priority Data

Jun. 23, 2004 (KR) .............................. 2004-47153

(51) Int. Cl.
*H03M 13/00* (2006.01)
(52) U.S. Cl. ................ 714/784; 714/796; 714/791; 714/792; 375/265
(58) Field of Classification Search ................ 714/784, 714/791–792, 796; 375/265
See application file for complete search history.

(56) References Cited

U.S. PATENT DOCUMENTS 6,810,084 B1 10/2004 Jun et al.

2001/0034867 A1 10/2001 Jaffe et al.
2002/0126222 A1 9/2002 Choi et al.

(Continued)

FOREIGN PATENT DOCUMENTS

JP 2007-519359 A 7/2007

(Continued)

OTHER PUBLICATIONS

International Preliminary Report on Patentability issued in PCT/KR2005/001940 on Jan. 26, 2007.

(Continued)

*Primary Examiner*—Guy J Lamarre
(74) *Attorney, Agent, or Firm*—Sughrue Mion, PLLC

(57) ABSTRACT

A digital broadcast transmitting system and a signal processing method thereof that improves the receiving performance of the system. A digital broadcast transmitter includes a randomizer to receive and randomize a transport stream into a specified position of which stuff bytes are inserted, a replacement sequence generator to generate known data including a predefined sequence, a stuff-byte exchange unit to insert the known data into the specified position of the transport stream into which stuff bytes are inserted, an encoder to encode the transport stream output from the stuff-byte exchange unit for an error correction, and a transmission unit to modulate the encoded transport stream, RF-convert the modulated transport stream and transmit the RF-converted data. The digital broadcast receiving performance is improved even in an inferior multi-path channel by detecting the known data from the received transmission and using the known data for synchronization and equalization.

12 Claims, 12 Drawing Sheets

U.S. PATENT DOCUMENTS

2002/0191712 A1    12/2002    Gaddam et al.
2002/0194570 A1    12/2002    Birru et al.
2003/0099303 A1    5/2003    Birru et al.

FOREIGN PATENT DOCUMENTS

KR    2001-111667    12/2001
WO    WO 02/085014    10/2002
WO    WO 2005/043916    5/2005

OTHER PUBLICATIONS

International Search Report mailed on Nov. 14, 2005, in International Application No. PCT/KR2005/001940.

International Preliminary Report on Patentability mailed on Jan. 11, 2007, in International Application No. PCT/KR2005/001940 (incorporates Written Opinion of the International Searching Authority mailed on Nov. 14, 2005, in International Application No. PCT/KR2005/001940).

U.S. Appl. No. 10/578,094, filed May 3, 2006, Eui-jun Park et al., Samsung Electronics Co., Ltd.

U.S. Appl. No. 12/261,826, filed May 30, 2008, Eui-jun Park et al., Samsung Electronics Co., Ltd.

U.S. Appl. No. 12/261,842, filed May 30, 2008, Eui-jun Park et al., Samsung Electronics Co., Ltd.

U.S. Appl. No. 12/261,921, filed May 30, 2008, Eui-jun Park et al., Samsung Electronics Co., Ltd.

U.S. Appl. No. 12/261,935, filed May 30, 2008, Eui-jun Park et al., Samsung Electronics Co., Ltd.

Search and Examination Report issued by on Sep. 20, 2008 by the Singapore Patent Office with respect to the Singapore Patent Application No. 200608396-8 filed on Nov. 30, 2006.

DIGITAL BROADCASTING TRANSMISSION CAPABLE OF IMPROVING RECEIVING AND EQUALIZING PERFORMANCE AND SIGNAL PROCESSING METHOD THEREOF

CROSS-REFERENCE TO RELATED APPLICATIONS

This application is a continuation of PCT International Patent Application No. PCT/KR 2005/001940 filed Jun. 23, 2005, and Korean Patent Application No. 2004-47153 filed Jun. 23, 2004 in the Korean Intellectual Property Office, the disclosures of which are incorporated herein by reference.

BACKGROUND OF THE INVENTION

1. Field of the Invention

An aspect of the present invention relates to a digital broadcasting transmission/reception system, and more specifically, to a digital broadcasting transmission system generating stuff byte in a Moving Picture Experts Group-2 transport stream (MPEG-2 TS), and operating and transmitting a pattern of known data using the stuff byte to improve reception performance and equalization performance of a reception system and a signal processing method thereof.

2. Description of the Related Art

The Advanced Television Systems Committee Vestigial Sideband (ATSC VSB) method, a U.S.-oriented terrestrial waves digital broadcasting system, is a single carrier method that uses a field sync by 312 segment unit. Accordingly, reception performance is not good in poor channels, especially in a Doppler fading channel.

FIG. 1 is a block diagram of a transmitter/receiver of a general U.S.-oriented terrestrial waves digital broadcasting system according to the ATSC digital television (DTV) standards.

The digital broadcasting transmitter of FIG. 1 has a data randomizer (110) for randomizing an MPEG-2 TS, an Reed-Solomon (RS) encoder (120) of a concatenated coder form for correcting errors generated by channels, an interleaver (130), and a ⅔ rate trellis encoder (140). The encoded data is mapped in 8 level symbols and field syncs and segment syncs are inserted into the data as shown in FIG. 2. After that the field syncs and the segments syncs are inserted, pilots are inserted into the data, the data is then VSB-modulated, upconverted into RF and transmitted.

Meanwhile, the digital broadcasting receiver of FIG. 1 lowers the RF signal to baseband, demodulates and equalizes the lowered signal, performs channel decoding, and restores the original signal in a reverse order of the digital broadcasting transmitter.

FIG. 2 shows a vestigial sideband (VSB) data frame of the U.S.-oriented DTV system. In FIG. 2, one frame consists of two fields and each field includes 312 data segments and a field sync segment. Each segment also has segment syncs of four symbols and data symbols of 828 symbols.

As shown in FIG. 1, the digital broadcasting transmitter randomizes the MPEG-2 TS through the randomizer (110). The randomized data is outer-coded through the RS encoder (120) which is an outer coder, and the outer-coded data is dispersed through the interleaver (130). The interleaved data is inner-coded by 12 symbol unit through the trellis encoder (140), and the inner-coded data is mapped in an 8 level symbol and the field syncs and segment syncs are inserted as shown in FIG. 2. Thereafter, the data includes DC offset to generate the pilot, and the data is VSB-modulated, upconverted to an RF signal and transmitted.

Meanwhile, the digital broadcasting receiver of FIG. 1 converts an RF signal received through a channel into a baseband signal through a tuner/IF (not shown). The baseband signal is synchronization-detected and demodulated through a demodulator (210), and any distortion by multi-path channel is compensated through an equalizer (220). The equalized signal is error-corrected and decoded into symbol data through a Viterbi decoder (230). The decoded data, which has been dispersed by the interleaver (130) of the transmitter, is rearranged through a deinterleaver (240), and the deinterleaved data is error-corrected through an RS decoder (250). The error-corrected data is de-randomized through a derandomizer (260) and output into an MPEG-2 TS.

In the VSB data frame of the US-oriented terrestrial waves DTV system of FIG. 2, one segment corresponds to one MPEG-2 packet. In FIG. 2, the segment sync and field sync, which are sync signals, are used for synchronization and equalization. The field sync and segment sync are known sequences and used as training data in the equalizer.

The VSB method of the U.S.-oriented terrestrial waves digital television system of FIG. 1 is a single carrier system and has the capacity to remove multipath in a multipath fading channel with Doppler. However, if the known sequence such as a field sync is used a lot, it is easier to estimate the channel and compensate the signal distorted by a multi-path in the equalizer using the known sequence.

However, as shown in the VSB data frame of the U.S.-oriented terrestrial waves digital television system of FIG. 2, a field sync which is a known sequence appears in every 313th segment. This is not frequent so the capacity to remove the multipath and equalize the received signal using this known sequence, is low.

SUMMARY OF THE INVENTION

An aspect of the present invention is to provide a digital broadcasting transmission system to improve reception performance and equalization performance of a reception system by adding a predefined known sequence, manipulating a pattern and transmitting a signal in a transmission system and a signal processing method, and a digital broadcasting reception system corresponding to the above and a signal processing method thereof.

A digital broadcasting transmitter according to an aspect of the present invention includes a randomizer for receiving and randomizing a data stream including stuff bytes at a certain location, a sequence provider for generating known data having a particular sequence to replace the stuff bytes, a stuff byte replacer for inserting the known data at the location of the randomized data stream where the stuff bytes are inserted, an encoder for encoding the data stream output from the stuff byte replacer for error-correction, and a transmission part for modulating, RF-converting and transmitting the encoded data stream.

According to another aspect of the present invention, the data stream includes information of the certain location where the stuff bytes are inserted.

According to another aspect of the present invention, the information of the location is inserted prior to a location where the stuff bytes are inserted and the information includes information of the length of the stuff data.

According to another aspect of the present invention, the transmitter further includes a control signal generator generating a control signal to control the stuff byte replacer to insert the known data at the location according to the information.

According to another aspect of the present invention, the encoder includes an RS encoder for adding a parity of certain bytes to correct errors generated by channels, an interleaver for interleaving the data added with the parity in a certain pattern, and a trellis encoder for trellis-encoding the interleaved data.

According to another aspect of the present invention, the trellis encoder has a memory element for trellis encoding operation and initializes the memory element from the location inserted with the known data for trellis-encoding.

According to another aspect of the present invention, the transmitter further includes a packet buffer receiving and temporarily storing the data stream from the RS encoder.

According to another aspect of the present invention, the packet buffer receives the data altered according to the initialization of the memory element from the trellis encoder and updates the stored data.

According to another aspect of the present invention, the transmitter further includes a RS re-encoder & replace parity for RS-encoding the updated data input from the packet buffer, generating the altered parity, outputting the parity to the trellis encoder and replacing the parity added by the RS encoder.

According to another aspect of the present invention, the interleaver outputs known data, inserted at the same location of a plurality of different data streams output from the RS encoder in continuous data streams.

According to another aspect of the present invention, the transmission part modulates the data in VSB modulation.

According to another aspect of the present invention, a signal processing method for digital broadcasting transmission includes receiving and randomizing a data stream inserted with stuff bytes at a certain location, generating a predefined particular sequence as known data, inserting the known data at the location inserted with the stuff bytes of the randomized data stream, encoding the data stream inserted with the known data for error-correction, and modulating, RF-converting and transmitting the encoded data stream.

According to an aspect of the present invention, a digital broadcasting transmitter generates and inserts stuff bytes in an MPEG-2 TS packet and transmits the inserted stuff bytes as known data, and a digital broadcasting receiver detects and uses the known data so that the digital broadcasting reception performance can be improved in poor multipath channels.

In addition, a sequence of the known data is manipulated in a pattern to improve performance of the equalization so that equalization performance and reception performance can be improved.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
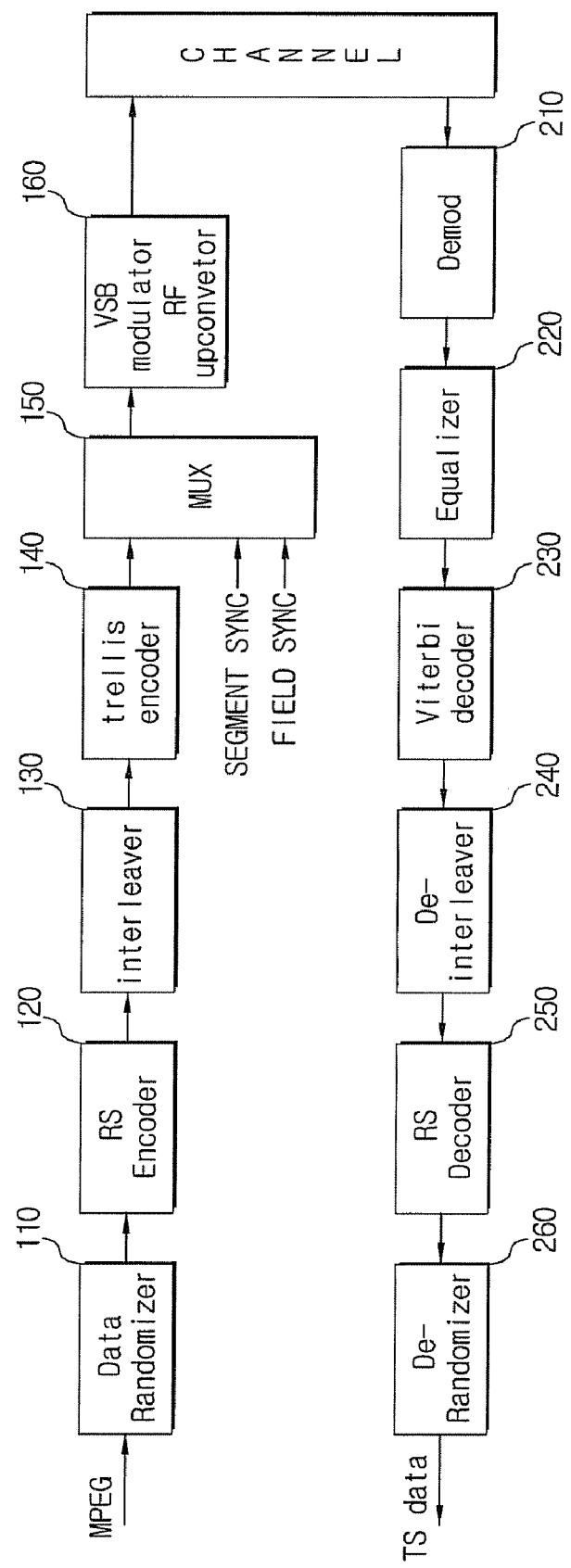
FIG. 1 is a block diagram illustrating a transmitter of a general U.S.-oriented terrestrial digital broadcasting system.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 3:
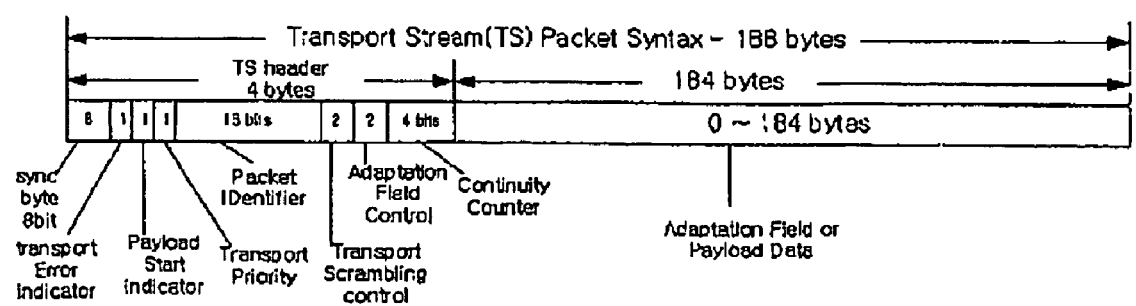
FIG. 3 is a view of a frame structure of a TS packet.
Figure 4:
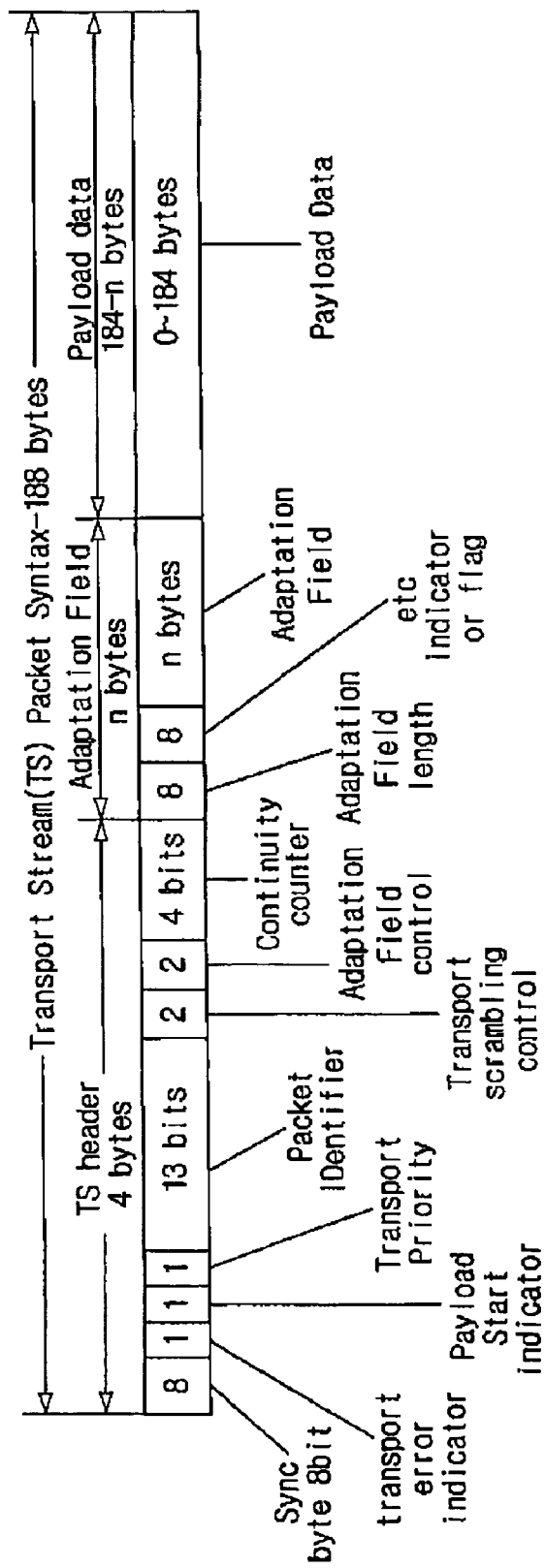
FIG. 4 is a view of a frame structure of a TS packet including a stuff byte.

FIG. 3 shows a frame structure of a Transport Stream (TS) packet and FIG. 4 shows a frame structure of a TS packet including a stuff byte. The TS packet of FIG. 4 includes an MPEG-2 header, an adaptation field and payload data. According to an aspect of the present invention, stuff bytes are inserted in the TS packet as illustrated in FIG. 4 so that all the TS streams have adaptation fields.

That is, the MPEG-2 TS packet of FIG. 4 is an MPEG-2 packet of 188 bytes and consists of an MPEG-2 header, an adaptation field and ES or payload data. The header includes 4 bytes with MPEG syncs, the adaptation field includes an adaptation field length section of 1 byte indicating the length of the adaptation field, an adaptation field data section having other information of 1 byte and stuff bytes of N bytes, and the payload data includes ES data of 188−(4+2+n) bytes.

Figure 5:
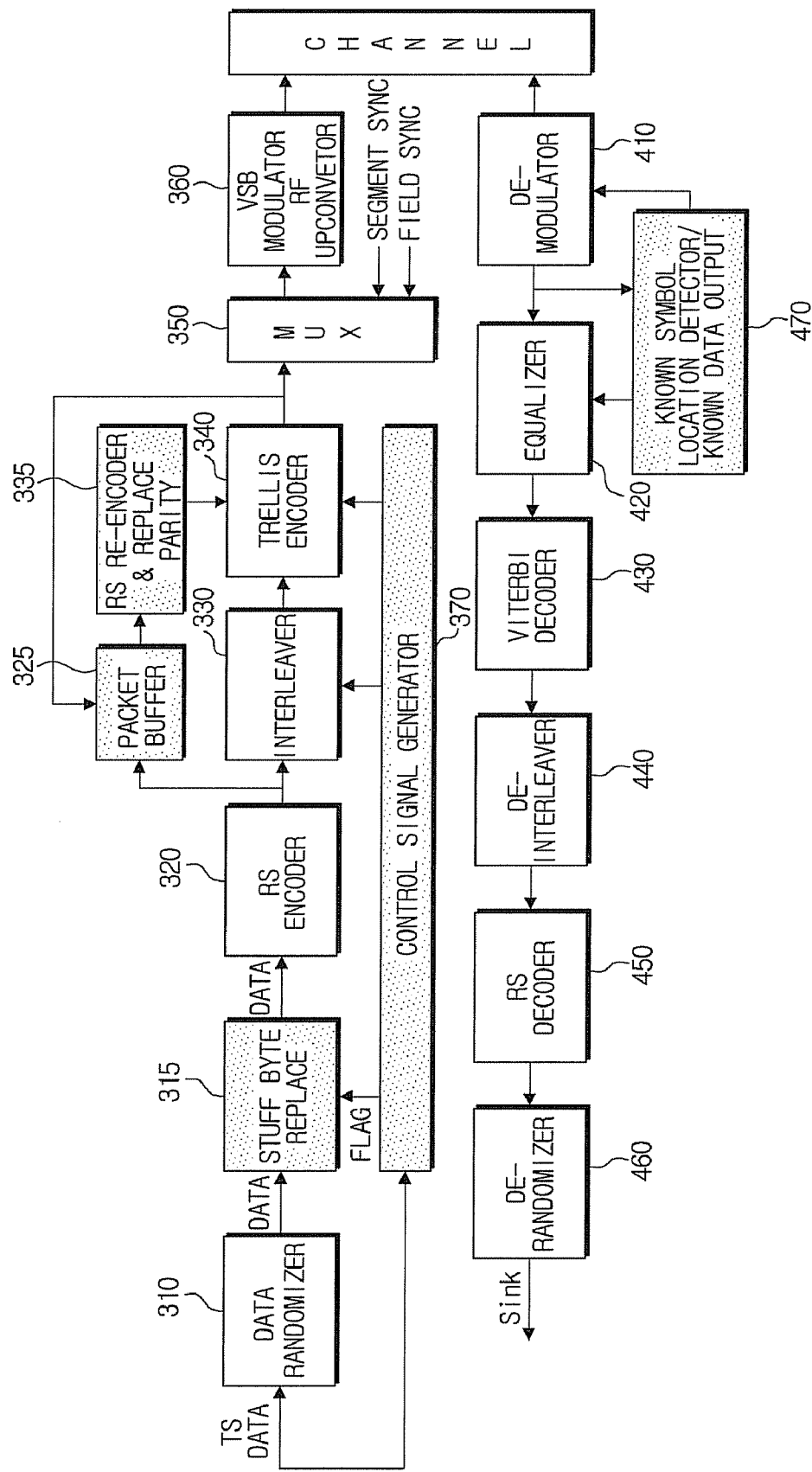
FIG. 5 is a block diagram of a digital broadcasting transmission system according to an embodiment of the present invention.

FIG. 5 is a block diagram illustrating a digital broadcasting transmission system according to an embodiment of the present invention. In FIG. 5, the digital broadcasting transmitter receives an MPEG-2 packet TS having the packet structure of FIG. 4 through a TS multiplexer (not shown).

Figure 2:
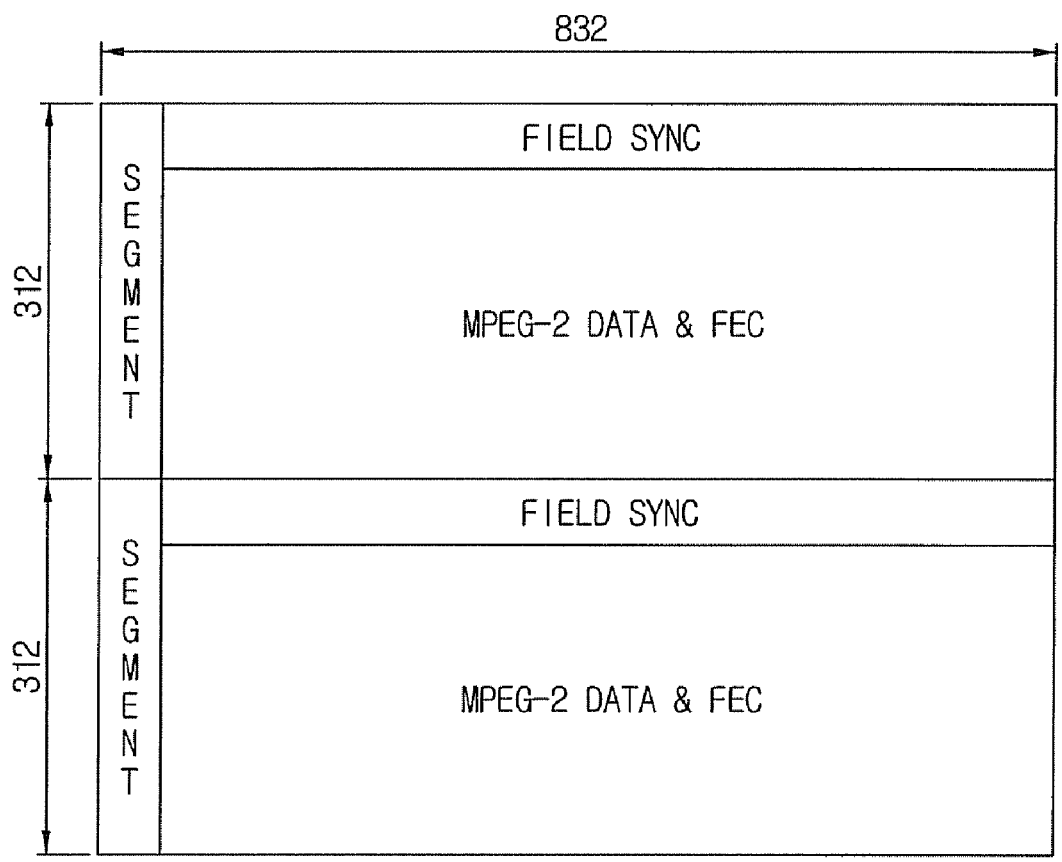
FIG. 2 is a view of a frame structure of ATSC VSB data.

In FIG. 5, the digital broadcasting transmitter has a data randomizer (310) randomizing the input TS stream, a stuff byte replacer (315) replacing the stuff byte of the randomized data with a particular sequence, an RS encoder (320) constructing the data output from the stuff byte replacer (315) in the concatenated code form to correct errors generated by channels, an interleaver (330) interleaving the data, a packet buffer (325) storing the RS-encoded reference data to initialize a memory of a trellis encoder (340) and replacing the previous value with an initialized value, an RS re-encoder & replace parity (335) performing RS-encoding using the altered value, generating a parity and inputting the parity to the trellis encoder (340), the trellis encoder (340) converting the interleaved data into symbols and performing ⅔ rate trellis encoding and 8 level symbol mapping, a multiplexer (350) inserting field syncs and segment syncs as shown in FIG. 2, a transmission part (360) for inserting a pilot, performing VSB-modulation, upconverting the data into RF and transmitting the data, and a control signal generator (370) generating a signal to control data processing.

Meanwhile, an MPEG-2 packet TS having the packet structure of FIG. 4 is input to the randomizer (310) through the TS multiplexer (not shown), randomized, replaced with a particular sequence for the stuff bytes by the stuff byte replacer (315) and output. The output data is outer-coded through the RS encoder (320) to correct errors by channels and the outer-coded data is dispersed through the interleaver (330).

Figure 10:
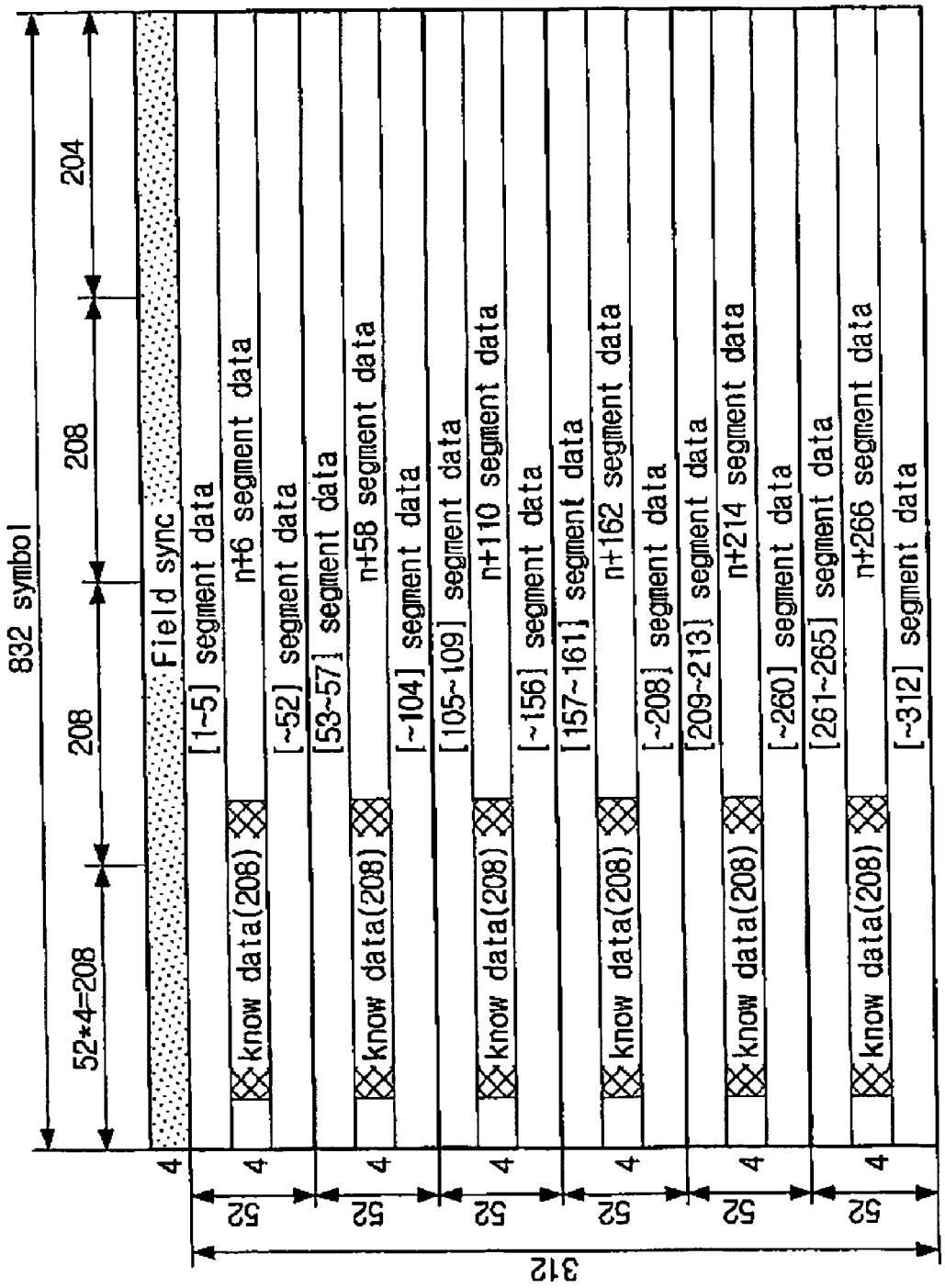
FIG. 10 is a view of a format of the data output from the trellis encoder of FIG. 5.

Subsequently, the interleaved data is inner-coded by a 12 symbol unit through the trellis encoder (340). The inner-coded data is mapped in 8 level symbols and the field syncs and segment syncs are inserted as shown in FIG. 10 by the multiplexer (350). Thereafter, the data includes a DC offset to generate a pilot and the data is VSB-modulated, up-converted into RF and transmitted.

Meanwhile, the control signal generator (370) detects the adaptation field length of FIG. 4, and generates and outputs a flag signal to indicate the location of stuff bytes or known sequence data based on the detected result.

Further, in FIG. 5, the trellis encoder (340) performs an initialization of 12 trellis encoder at the beginning location of the known sequence, for example, in order for the value of the memory element of the encoder to become '00'. The sequence altered by the initialization replaces the value stored in the packet buffer (325) and the new parity generated by the RS re-encoder & replace parity (335) replaces the value of the original parity location input to the trellis encoder (340) so that the initialization is performed.

FIG. 6 to FIG. 10 show data formats while an MPEG-2 packet with stuff bytes passes through channel encoder blocks of the digital broadcasting transmitter.

Figure 6:
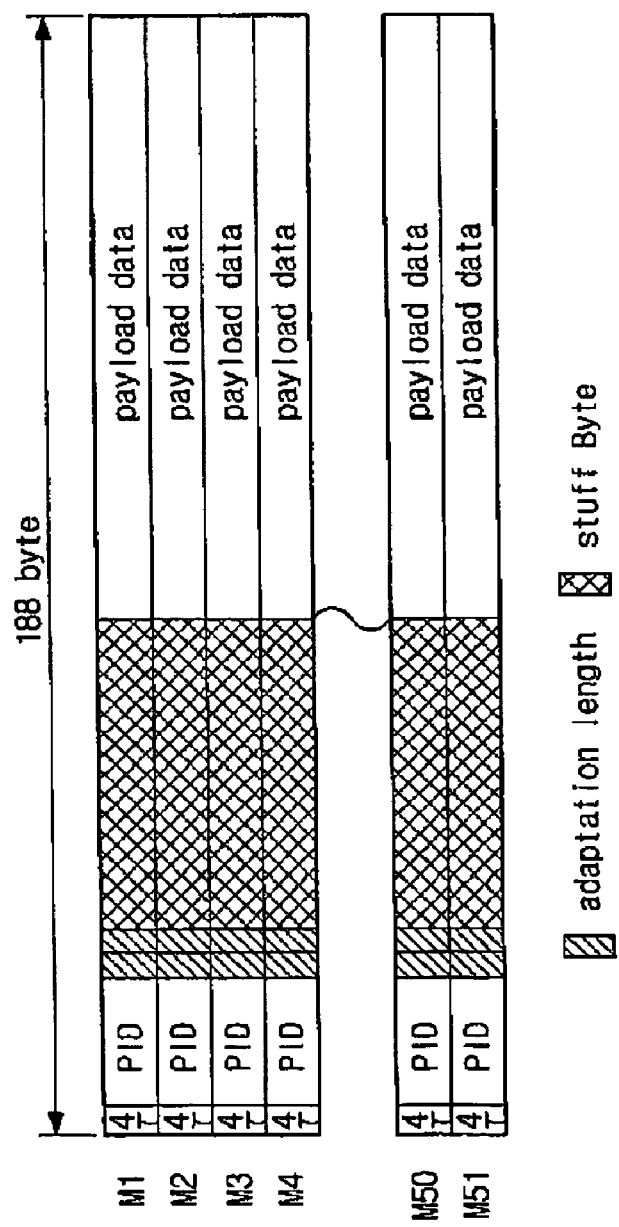
FIG. 6 is a view of a format of the data input to the randomizer of FIG. 5.
Figure 7:
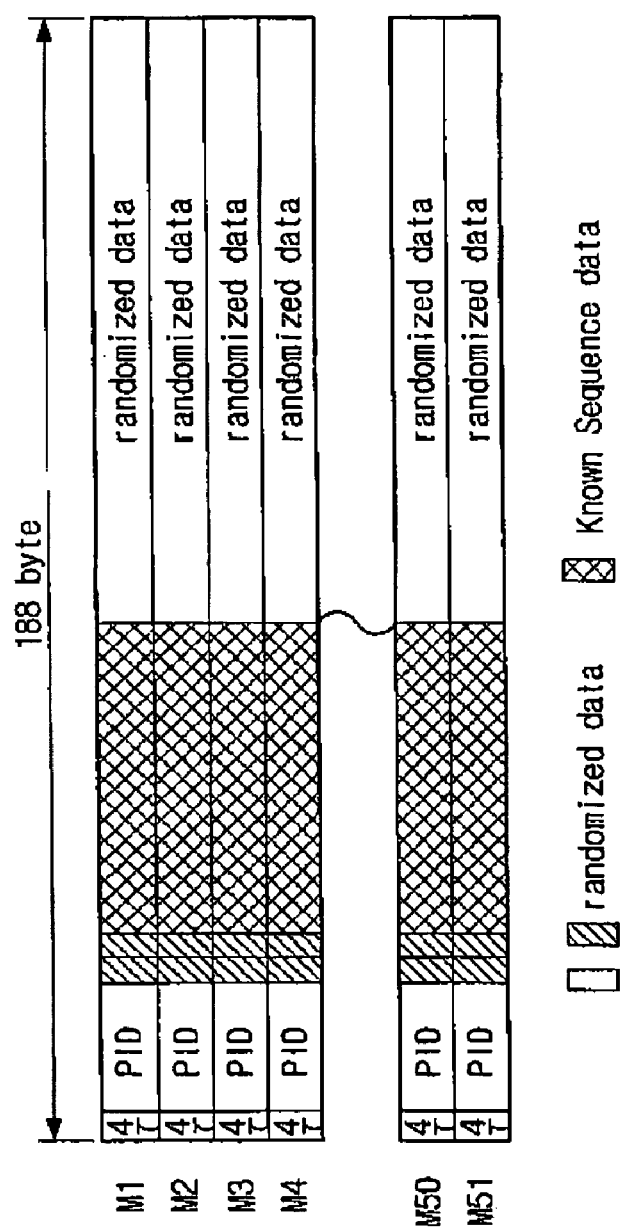
FIG. 7 is a view of a format of the data output from the randomizer of FIG. 5.
Figure 8:
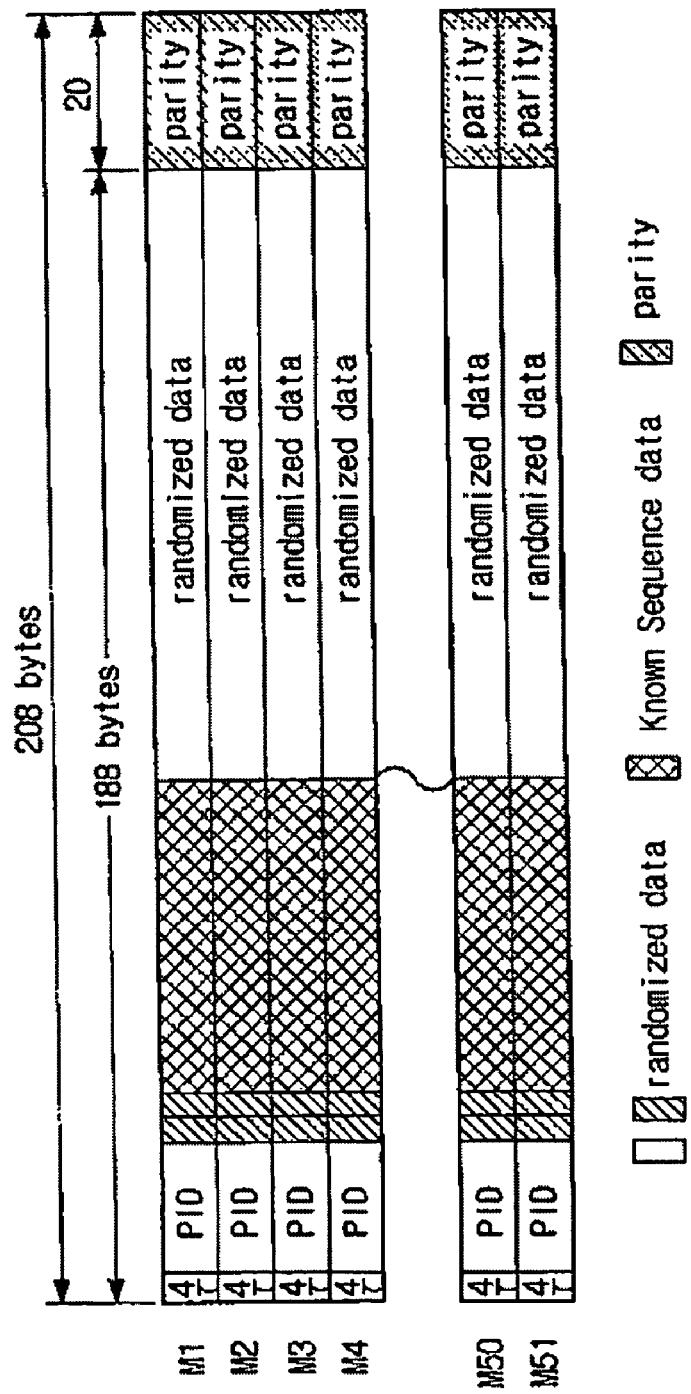
FIG. 8 is a view of a format of the data output from the RS encoder of FIG. 5.

FIG. 6 shows a format of the data input to the randomizer (310) and FIG. 7 shows a data format after replacing n stuff bytes of the randomized data with particular sequence data. FIG. 8 shows a data format of the RS-encoded data added with RS parity and FIG. 9 shows a data format of the data output from the interleaver (330).

Figure 11:
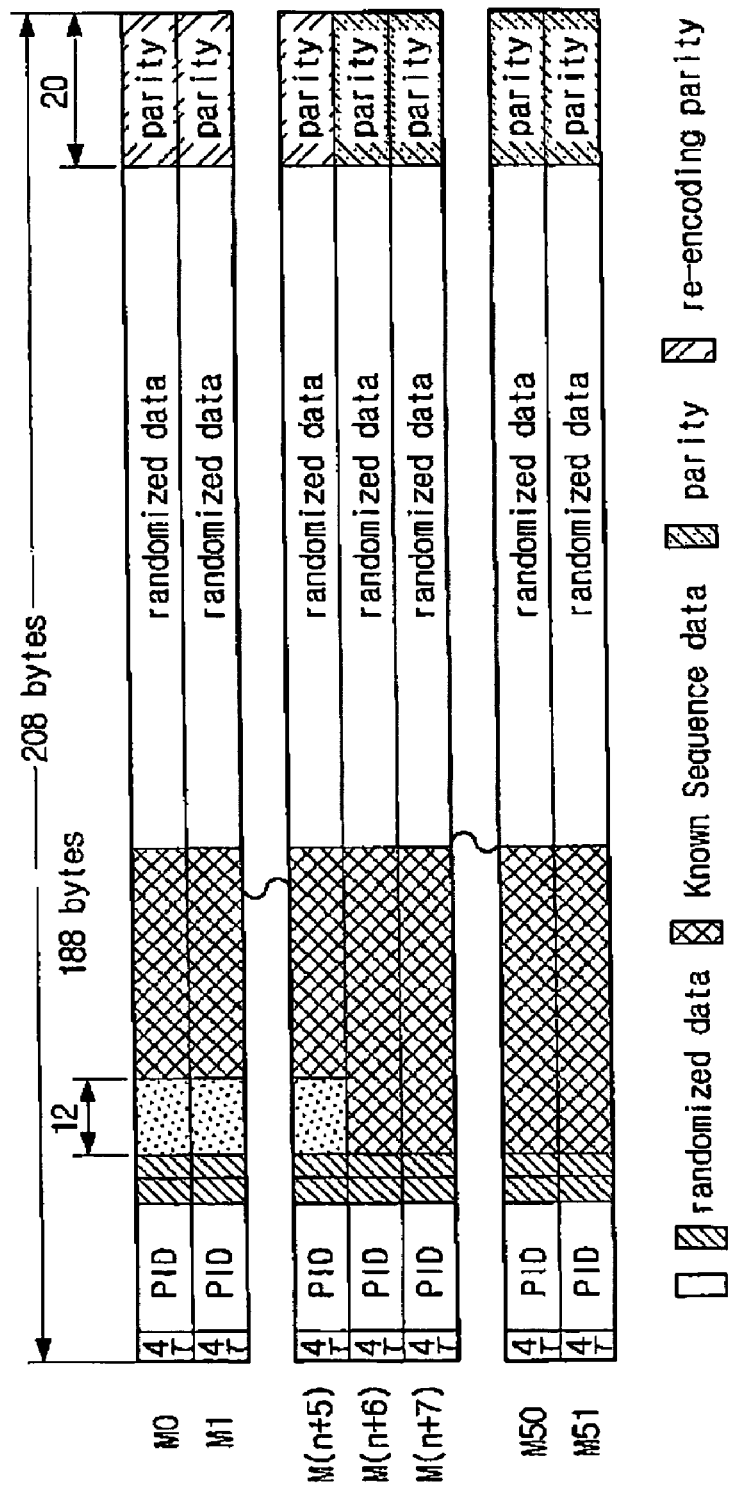
FIG. 11 is a view of a format of the data output from an RS re-encoder according to trellis initialization of the known sequence section.

Further, FIG. 10 shows a format of the 12 symbol interleaved data output from the trellis encoder (340). FIG. 11 is a format of the data whose parity is restructured by the RS re-encoder & replace parity (335) of FIG. 3. In FIG. 10, one field includes six convolutional interleavers, so there are six sequences with stuff bytes. That is, if a TS includes stuff bytes of 10 bytes, one field has known sequences of 10*6=60. If the trellis encoder (340) is initialized at the beginning location of the known sequence, the output parity of the RS encoder (320) is altered by the value of initialization and trellis encoding is performed by updating with the altered parity.

Figure 9:
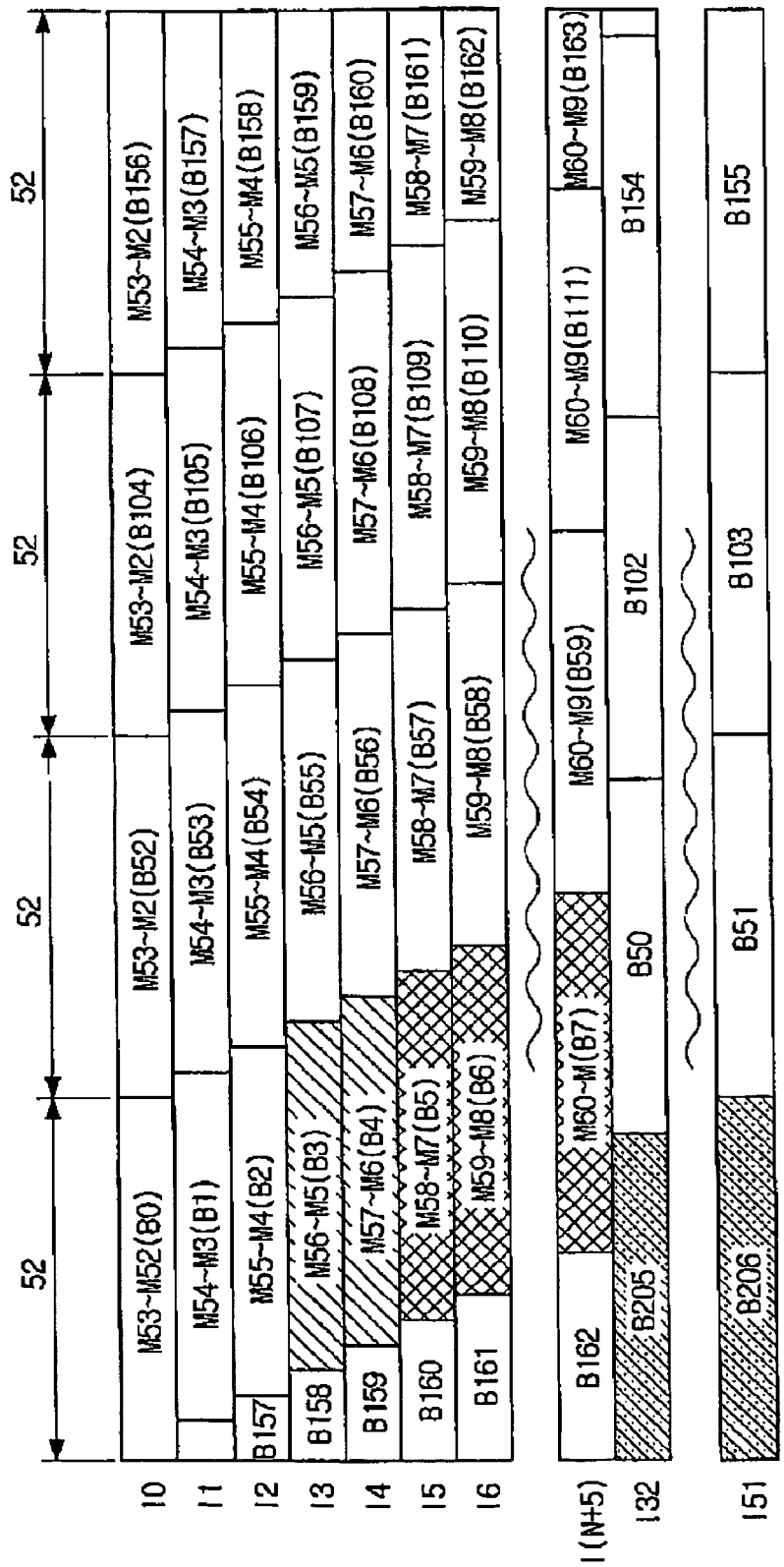
FIG. 9 is a view of a format of the data output from the data interleaver of FIG. 5.

The MPEG-2 packet of FIG. 6 is dispersed by 52 units by the interleaver (330) as shown in FIG. 9. The data located in the same byte of the MPEG-2 packet constructs the same column as shown in FIG. 9 after data interleaving. Additionally, the interleaved data are 12-symbol-interleaved by the trellis encoder (340) as shown in FIG. 10. That is, the data of the same location in MPEG-2 packets construct almost one data segment as shown in FIG. 10 after trellis encoding. Therefore, if a particular part of an MPEG-2 packet is continuously added with stuff bytes, randomized, replaced with a particular sequence and trellis-encoded, the stuff bytes form one data segment which is a known signal and a digital broadcasting receiver uses the known signal to improve reception performance.

FIG. 11 shows a data format after RS re-encoding and parity restructuring by the RS re-encoder & replace parity (335) of FIG. 5. That is, if the trellis encoder (340) is initialized at the beginning location of a sequence of the known symbol, output parity of the RS encoder (320) is altered by the value of the initialization and trellis encoding is performed by being updated with the altered parity so that there is no problem in decoding of the RS decoder of a digital broadcasting receiver which will be briefly described below. That is, the trellis encoder is initialized in order for the trellis-encoded data to form a regular sequence during the known symbol sequence section, RS encoding is performed to replace the data of the initialization location so that parity is altered and the altered parity replaces the original parity. FIG. 11 shows the data format.

In a digital broadcasting transmitter, if the information on the number of stuff bytes is inserted in a reserved section of a field sync data segment section, a known symbol number detector (not shown) of a known symbol location detector/known data output (not shown) of the digital broadcasting receiver detects the information on the number of the known data, a segment flag generator (not shown) and trellis interleaver (not shown) find the location information of the known symbol based on the information, and a known data extractor (not shown) outputs and uses the known data from the acquired information to improve reception performance of the digital broadcasting receiver. As the location of stuff bytes is always fixed, if the information on the number of the stuff bytes is acquired, the segment flag generator (473) and trellis interleaver (475) can be implemented using a counter and control logic.

Figure 12:
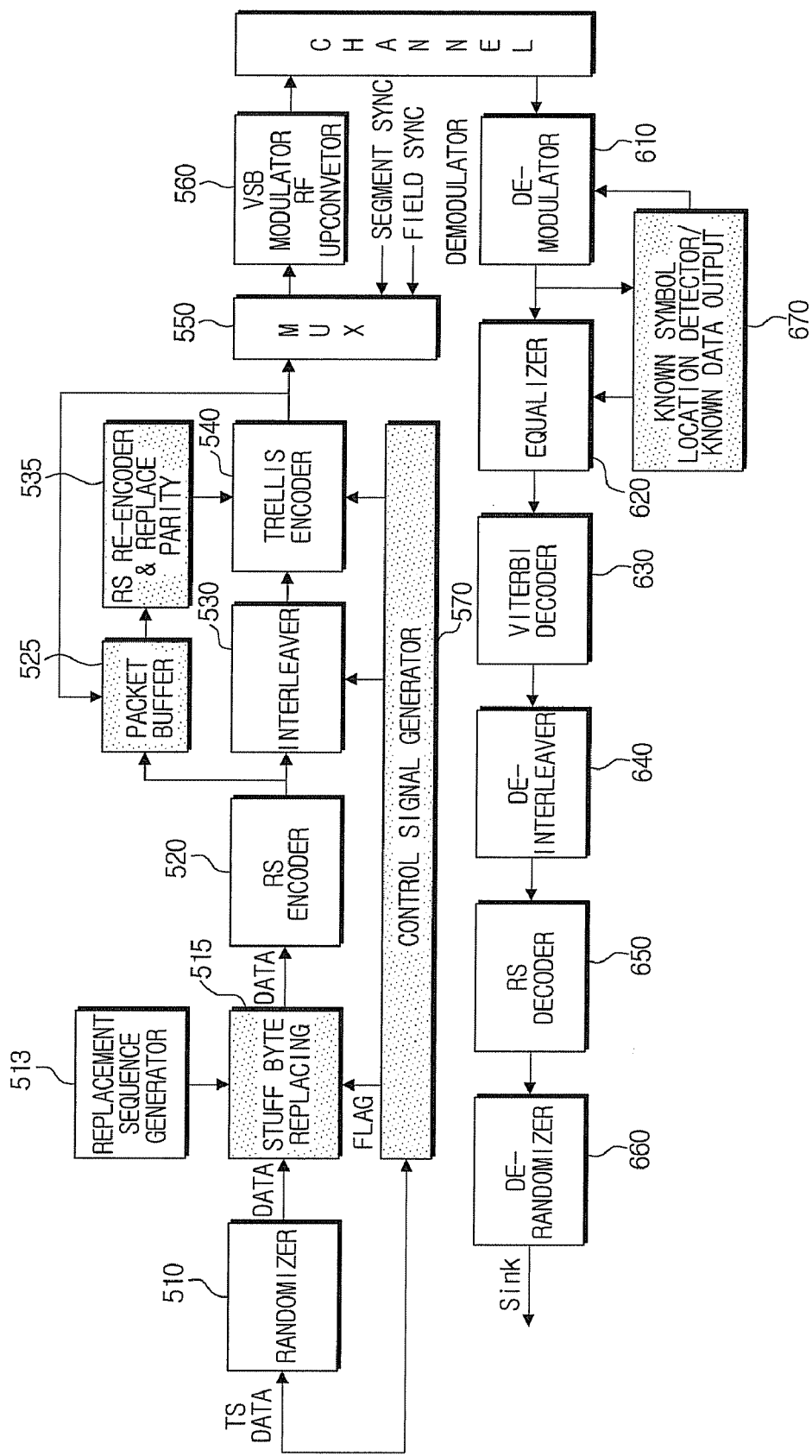
FIG. 12 is a block diagram illustrating a digital broadcasting transmission system according to another embodiment of the present invention.

FIG. 12 is a block diagram illustrating a digital broadcasting transmission system according to another embodiment of the present invention. In FIG. 12, the digital broadcasting transmitter has a randomizer (510) for randomizing data of the input TS stream, a stuff byte replacer (515) for replacing the stuff byte of the randomized data with a particular sequence generated in a replacement sequence generator (513), an RS encoder for constructing the data output from the stuff byte replacer (515) in the concatenated code to correct errors generated by channels, an interleaver (530) for interleaving the data, a packet buffer (525) for storing the RS-encoded reference data to initialize a memory of the trellis encoder (540) and replacing the stuff byte with an initialized value, an RS re-encoder & replace parity (535) for performing RS-encoding using the altered value to generate parity and inputting the data to the trellis encoder (540), the trellis encoder (540) for converting the interleaved data into a symbol and performing ⅔ trellis encoding and 8 level symbol mapping, a multiplexer (550) for inserting a field sync and segment sync as in the data format of FIG. 2, a transmission part (560) for inserting a pilot, performing VSB-modulation, converting the data into RF and transmitting the data, and a control signal generator (570) for generating a signal to control data processing.

The function and operation of each component of the digital broadcasting transmission system of FIG. 12 are similar to the components of FIG. 5. Therefore, a detailed description of the function and operation is omitted and the difference will be described.

A stuff byte replacer (515) replaces stuff bytes of the data randomized by the randomizer (510) with a particular sequence and outputs the data. In this case, a pattern of the particular sequence may be adjusted in order for the symbols mapped through the trellis encoder (540) to be operated by an equalizer in a receiver.

Therefore, according to another embodiment of the present invention, the digital broadcasting transmitter further includes the replacement sequence generator (513) for generating a particular sequence to replace the stuff bytes and providing the particular sequence to the stuff byte replacer (515) in order for the pattern of the known sequence generated by replacing the stuff bytes to operate the equalizer.

According to another embodiment of the present invention the replacement sequence generator (513), and a parity reconstruction (535) of the transmitter operate differently from the digital broadcasting transmission system of FIG. 5.

The replacement sequence generator (513) includes a memory (not shown) for storing the particular sequence to replace the stuff bytes in the stuff byte replacer (515) and a circuit (not shown) for controlling a memory address.

If the sequence pattern of the known data of FIG. 9 and FIG. 10 has a random pattern without DC offset, operation performance of the equalizer can be improved. Accordingly, the replacement sequence generator (513) may preferably generate a particular sequence to replace the stuff bytes so that the sequence pattern of the known data mapped after trellis encoding of the trellis encoder (540) in the stuff byte replacer (515) has the random pattern without DC offset.

First, in order for the sequence of the known data to have a desirable pattern, the memory value of the trellis encoder (540) has to be initialized.

The compatibility is maintained with the existing receiver and the memory value of the trellis encoder (340) is initialized by the packet buffer (325) and RS re-encoder & replace parity (335) of FIG. 5.

According to a method of an embodiment of the present invention, the method initializes the memory value of the trellis encoder (340) of part of the stuff bytes according to the number of stuff bytes instead of the entire stuff bytes in order to be compatible with the existing receiver. Accordingly, the initialized stuff bytes can limitedly have a desirable pattern.

Therefore, in another embodiment of the present invention, the function of initializing a memory value of the trellis encoder (540) for the entire stuff bytes, is added to the RS re-encoder & replace parity (535). That is, the RS re-encoder & replace parity (535) is compatible with the existing receiver and initializes the memory value of the trellis encoder (540), according to an embodiment of the present invention, depending on initial set-up and user choice, and ignores the compatibility with the existing receiver and initializes the memory value of the trellis encoder (540) for the entire stuff bytes.

The value of the part that initializes the memory value of the trellis encoder of the particular sequence, which is generated in the replacement sequence generator (513) and replaces the stuff bytes in the stuff byte replacer (515), can be any value. The replacement sequence generator (513) considers the symbol value, mapped after trellis-encoding according to the memory value to have the desired pattern by the sequence of the known data wants after the initialization, and generates the particular sequence to replace the stuff bytes.

The replacement sequence generator (513) stores the above particular sequence in the memory (now shown) and is controlled to adjust the sync by a control signal generator (570). Accordingly, the sequence of the known data improves the operation performance of the equalizer and the receiver.

As above-described, stuff bytes are generated and inserted in an MPEG-2 TS packet, the inserted stuff bytes are transmitted as known data from the digital broadcasting transmitter and the digital broadcasting receiver detects and uses the known data so that reception performance such as sync acquisition and equalization performance can be improved.

In addition, the sequence of the known data improves the operation performance of the equalizer so that the reception performance of the receiver can also be improved.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A digital broadcast receiver, comprising:
   a tuner to receive a data stream including known data;
   a demodulator to demodulate the data stream;
   a known data detector to detect the known data from the demodulated data stream; and
   an equalizer to equalize the demodulated data stream using the known data,
   wherein the data stream is transmitted from a digital broadcast transmitter comprising a known data generator to generate known data, a known data inserting unit to add the known data to the data stream, and a Trellis encoder to perform Trellis encoding using internal memories and to reset the internal memories at a predetermined time point according to a control signal for controlling Trellis resetting.

2. The receiver according to claim 1, wherein the known data inserting unit of the digital broadcast transmitter causes the known data to be included in a predetermined location of the data stream according to a control signal for controlling a process of inserting known data.

3. The receiver according to claim 1, wherein an RS encoder included in the digital broadcast transmitter compensates an RS parity of the data stream to correspond to the memory resetting.

4. The receiver according to claim 1, wherein if the known data are detected, the demodulator demodulates a following data stream using the detected known data.

5. The receiver according to claim 1, wherein the known data detector detects control information regarding location or length of the known data from the data stream, and detects the known data using the detected control information.

6. The receiver according to claim 1, wherein the data stream is processed to be robust against errors.

7. A method for processing a stream of a digital broadcast receiver, the method comprising:
   receiving a data stream including known data;
   demodulating the data stream;
   detecting information regarding a location of known data from the demodulated data stream, and detecting known data using the detected information; and
   equalizing the demodulated data stream using the known data,
   wherein the data stream is transmitted from a digital broadcast transmitter comprising a known data generator to generate known data, a known data inserting unit to add the known data to the data stream, and a Trellis encoder to perform Trellis encoding using internal memories and to reset the internal memories at a predetermined time point according to a control signal for controlling Trellis resetting.

8. The method according to claim 7, wherein the known data inserting unit of the digital broadcast transmitter causes the known data to be included in a predetermined location of the data stream according to a control signal for controlling a process of inserting known data.

9. The method according to claim 7, wherein an RS encoder included in the digital broadcast transmitter compensates an RS parity of the data stream to correspond to the memory resetting.

10. The method according to claim 7, wherein the demodulating uses the detected known data.

11. The method according to claim 7, wherein the detecting detects control information regarding location or length of the known data from the data stream, and detects the known data using the detected control information.

12. The method according to claim 7, wherein the data stream is processed to be robust against errors.

* * * * *